US011270069B1

United States Patent
Johnson et al.

(10) Patent No.: US 11,270,069 B1
(45) Date of Patent: Mar. 8, 2022

(54) COLLABORATION SYNCHRONIZATION ACROSS DEVICES

(71) Applicant: InVisionApp Inc., New York, NY (US)

(72) Inventors: David Johnson, San Francisco, CA (US); João Portela, New York, NY (US); Todd A. Eiles, New York, NY (US); Max Nunes, New York, NY (US); Jonathon Wilson, New York, NY (US)

(73) Assignee: InVisionApp Inc., New York, NY (US)

( * ) Notice: Subject to any disclaimer, the term of this patent is extended or adjusted under 35 U.S.C. 154(b) by 81 days.

(21) Appl. No.: 15/967,564

(22) Filed: Apr. 30, 2018

(51) Int. Cl.
| | |
|---|---|
| *G06F 40/197* | (2020.01) |
| *G06F 3/048* | (2013.01) |
| *H04L 29/08* | (2006.01) |
| *H04L 29/06* | (2006.01) |
| *H04L 67/01* | (2022.01) |
| *H04L 67/1095* | (2022.01) |

(52) U.S. Cl.
CPC ........... *G06F 40/197* (2020.01); *G06F 3/048* (2013.01); *H04L 67/1095* (2013.01); *H04L 67/42* (2013.01)

(58) Field of Classification Search
CPC .... G06F 17/2288; G06F 3/048; G06F 40/197; H04L 67/42; H04L 67/1095
See application file for complete search history.

(56) References Cited

U.S. PATENT DOCUMENTS

| | | | | |
|---|---|---|---|---|
| 5,806,078 | A * | 9/1998 | Hug | G06F 40/197 715/205 |
| 8,453,052 | B1 * | 5/2013 | Newman | G06F 17/2211 715/255 |
| 2011/0191858 | A1 * | 8/2011 | Shapiro | G06F 21/6209 726/27 |
| 2011/0252312 | A1 * | 10/2011 | Lemonik | H04L 67/02 715/255 |
| 2012/0185762 | A1 * | 7/2012 | Ozer | G06F 40/197 715/229 |
| 2012/0331568 | A1 * | 12/2012 | Weinstein | H04L 12/185 726/29 |
| 2013/0151940 | A1 * | 6/2013 | Bailor | G06F 40/166 715/229 |
| 2013/0218845 | A1 * | 8/2013 | Kleppner | G06F 17/24 707/687 |
| 2016/0140789 | A1 * | 5/2016 | Wickersham, III | H04L 12/1827 705/12 |

(Continued)

*Primary Examiner* — Jennifer N Welch
*Assistant Examiner* — Parmanand D Patel
(74) *Attorney, Agent, or Firm* — McDermott Will & Emery LLP

(57) ABSTRACT

A method including receiving, in a server, a first proposal for modifying a document from a user in a first client device, is provided. The document is a collaboration between users hosted by the server, and includes evaluating the first proposal in view of a second proposal selected from a proposal queue that stores multiple proposals from the users, converting the first proposal into a fact when no conflict is identified between the first proposal and the second proposal, and updating a fact sequence in a fact history log to include the fact. The method also includes providing the fact sequence to the first client device for executing at least a portion of the sequence of documented actions. A system and a non-transitory, computer readable medium storing instructions to perform the above method are also provided.

20 Claims, 9 Drawing Sheets

(56) References Cited

U.S. PATENT DOCUMENTS

2016/0292289 A1* 10/2016 Milvaney .............. G06F 3/0484
2017/0192952 A1* 7/2017 Lehmann .............. G06F 40/166
2019/0179876 A1* 6/2019 Zhang ................. G06F 17/2264

* cited by examiner

COLLABORATION SYNCHRONIZATION ACROSS DEVICES

BACKGROUND

Field

The present disclosure generally relates to network applications that enable collaboration between multiple users. More specifically, the present disclosure relates to devices and systems for synchronization of document actions between multiple users collaborating in the production of a document.

Description of the Related Art

Collaborative network applications are becoming highly relevant as the concept of a workplace shifts to less traditional environments. As the number of remote users collaborating on a document increases, the variety of devices participating in a networked effort also increases, with an ever growing range of modalities of communication with a central server hosting the collaboration. Accordingly, data conflict between different users attempting to push changes and other document actions through the document becomes a demanding task for the central server. Data conflict is exacerbated when document changes attempted by the user have an unchecked level of granularity, thereby cluttering communication channels and slowing the parsing of the data by the remote server, thus introducing delays, mismatch between different versions of the document, and unrecoverable errors in the collaboration process.

SUMMARY

In one embodiment of the present disclosure, a computer-implemented method is described for receiving, in a server, a first proposal for modifying a document from a user in a first client device, wherein the document is a product of a collaboration between multiple users hosted by the server. The computer-implemented method includes evaluating the first proposal in view of a second proposal selected from a proposal queue that stores multiple proposals from the users, converting the first proposal into a documented action when no conflict is identified between the first proposal and the second proposal, and updating a sequence of documented actions in a history log to include the documented action. The computer-implemented method also includes providing the sequence of documented actions to the first client device for executing at least a portion of the sequence of documented actions.

According to one embodiment, a system is described that includes one or more processors and a memory coupled to the one or more processors, the memory including instructions that, when executed by the one or more processors, cause the one or more processors to receive, in a server, a first proposal for modifying a document from a user in a first client device, wherein the document is a product of a collaboration between multiple users hosted by the server. The one or more processors execute instructions to evaluate the first proposal in view of a second proposal selected from a proposal queue that stores multiple proposals from the users, to convert the first proposal into a documented action when no conflict is identified between the first proposal and the second proposal, and to update a sequence of documented actions in a history log to include the documented action. The one or more processors execute instructions to provide the sequence of documented actions to the first client device to execute at least a portion of the sequence of documented actions.

According to one embodiment, a non-transitory, computer readable medium is described that includes instructions, which when executed by one or more processors, cause a computer to perform a method for combining multiple document operations into a cluster to form a proposal for modifying a document based on a contextual purpose for the document operations, wherein the document is a product of a collaboration between multiple users hosted by a server. The method also includes transmitting the proposal for modifying the document from a client device to the server, receiving, from the server, a notification that the proposal has been successfully accepted, and receiving, from the server, a sequence of documented actions updated to include a documented action associated with the proposal. The method also includes requesting, to the server, a selected version of the document, and executing, at least partially, the sequence of documented actions to obtain the selected version of the document in the client device.

In yet other embodiment, a system is described that includes a means for storing commands and a means for executing the commands causing the system to perform a method that includes combining multiple document operations into a cluster to form a proposal for modifying a document based on a contextual purpose for the document operations, wherein the document is a product of a collaboration between multiple users hosted by a server. The method also includes transmitting the proposal for modifying the document from a client device to the server, receiving, from the server, a notification that the proposal has been successfully accepted, and receiving, from the server, a sequence of documented actions updated to include a documented action associated with the proposal. The method also includes requesting, to the server, a selected version of the document, and executing, at least partially, the sequence of documented actions to obtain the selected version of the document in the client device It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description, serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
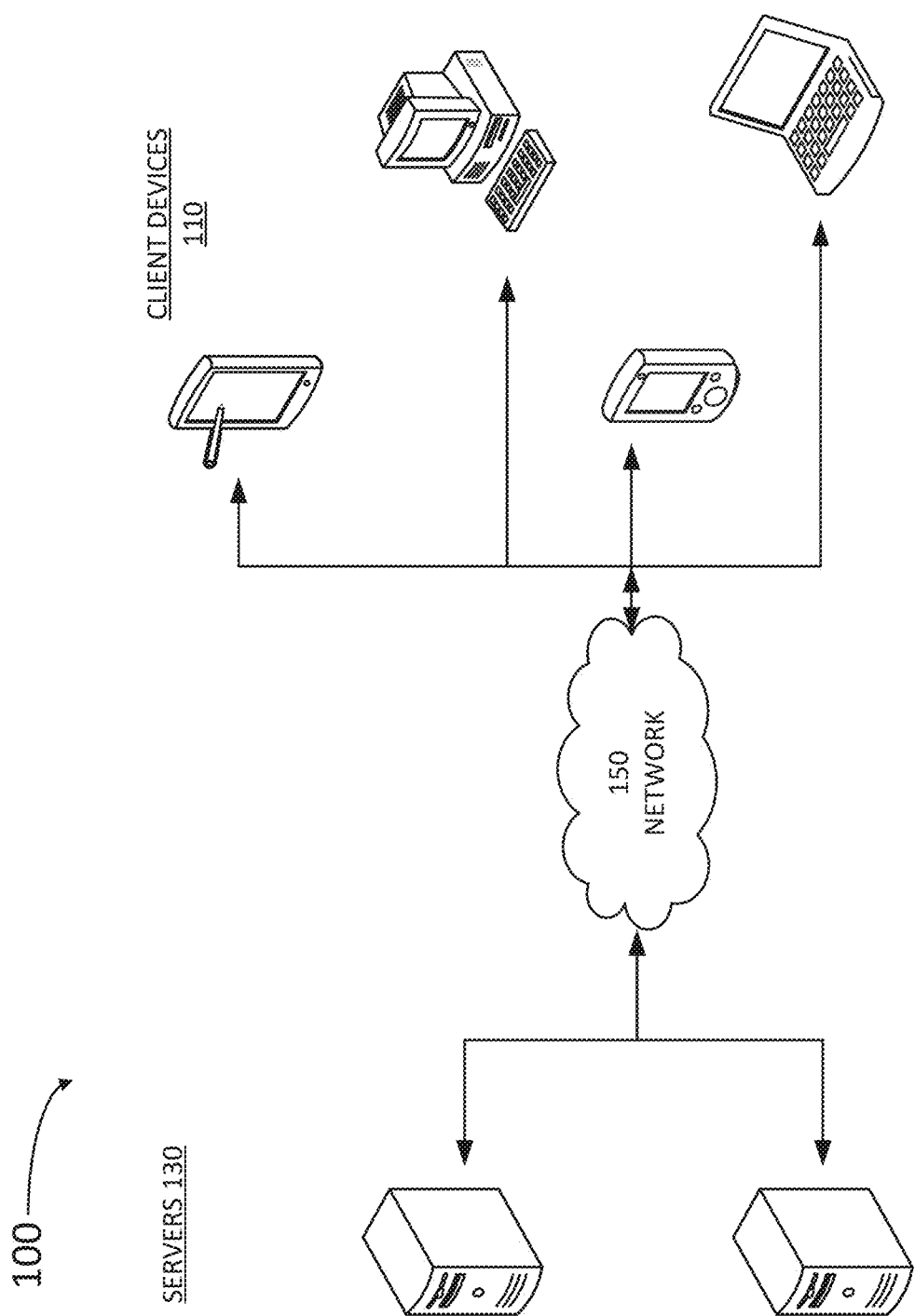
FIG. 1 illustrates an example architecture suitable for collaboration synchronization across devices, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file.

The present disclosure relates to data synchronization protocols and formats including a series of semantic, contextual, and atomic events ("Proposals") that determine the state of a document in a collaborative application at a given point in time. The atomic events form a chronological series that may register in a server for document persistence and storage and for synchronizing multiple devices (e.g., mobile devices, smartphones, laptops, pads, and the like) that participate in the collaborative application, thus enabling collaboration between remote users. The chronological series of events can be used to materialize the document at any desired point in time over the collaboration.

Embodiments as disclosed herein provide a technical solution to the technical problem of synchronizing multiple user inputs into a collaboration document, arising in the realm of computer technology and network collaboration engines. To solve this problem, some embodiments include proposals for modifying the document to the server hosting the collaboration document. The proposals include clusters of multiple document operations to simplify the task for the server to evaluate and process input from users participating in the collaboration document. This step enables systems consistent with the present disclosure to efficiently and seamlessly synchronize efforts from the users, maintain updated versions of the collaboration documents in real time, and to provide prior validated versions of the collaboration document to any of the users, upon request.

In some embodiments, the proposals are generated by the multiple client devices from the remote users, and presented to the host. The host evaluates the proposals in view of multiple other proposals from the other users participating in the collaboration document, and issues approval/rejection certificates to the users, via the client devices.

The subject system provides several advantages, including a reduced latency between user input and server validation in a collaboration document. Another advantage is the reduced time, and increased reliability, for any user to retrieve older versions of the collaboration document. Further, in some embodiments the server host may save extra storage space since the different versions of the collaboration document are recovered through a stack of facts stemming from authorized user proposals (e.g., a fact history log), rather than through multiple document versions stored in a database.

The proposed solution further provides improvements to the functioning of the computer itself, because it also reduces the use of storage space in the client devices by providing an authorized stack of fact that each user may access to regenerate any desired version of the collaboration document instead of storing multiple versions in memory.

Embodiments disclosed herein include tools for combining multiple document operations into proposals having a user context and purpose. Further, some embodiments include tools for combining multiple proposals from one or more users into a proposal bundle for the server hosting the collaboration engine.

Embodiments as disclosed herein combine technology to generate proposals for modifying a collaboration document with technology to evaluate and validate the proposals and generate a stack of facts that enable the regeneration of multiple versions of the collaboration document.

Example System Architecture

FIG. 1 illustrates an example architecture 100 for practicing some implementations of the disclosure. Architecture 100 includes servers 130 and client devices 110 connected over a network 150. One of the many servers 130 is configured to host a memory including instructions which, when executed by a processor, cause the server 130 to perform at least some of the steps in methods as disclosed herein. In some embodiments, the processor is configured to perform client device 110 from a third party website. The target image may be retrieved from a license history of the user, which may be stored in a fact history log in a memory of the server hosting the collaborative application. For purposes of load balancing, multiple servers 130 can host memories including instructions to one or more processors, and multiple servers 130 can host a fact history log and the document database.

Servers 130 may include any device having an appropriate processor, memory, and communications capability for hosting the fact history log, the image database, and a collaboration engine. The collaboration engine may be accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the collaboration engine and the history log on one or more servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
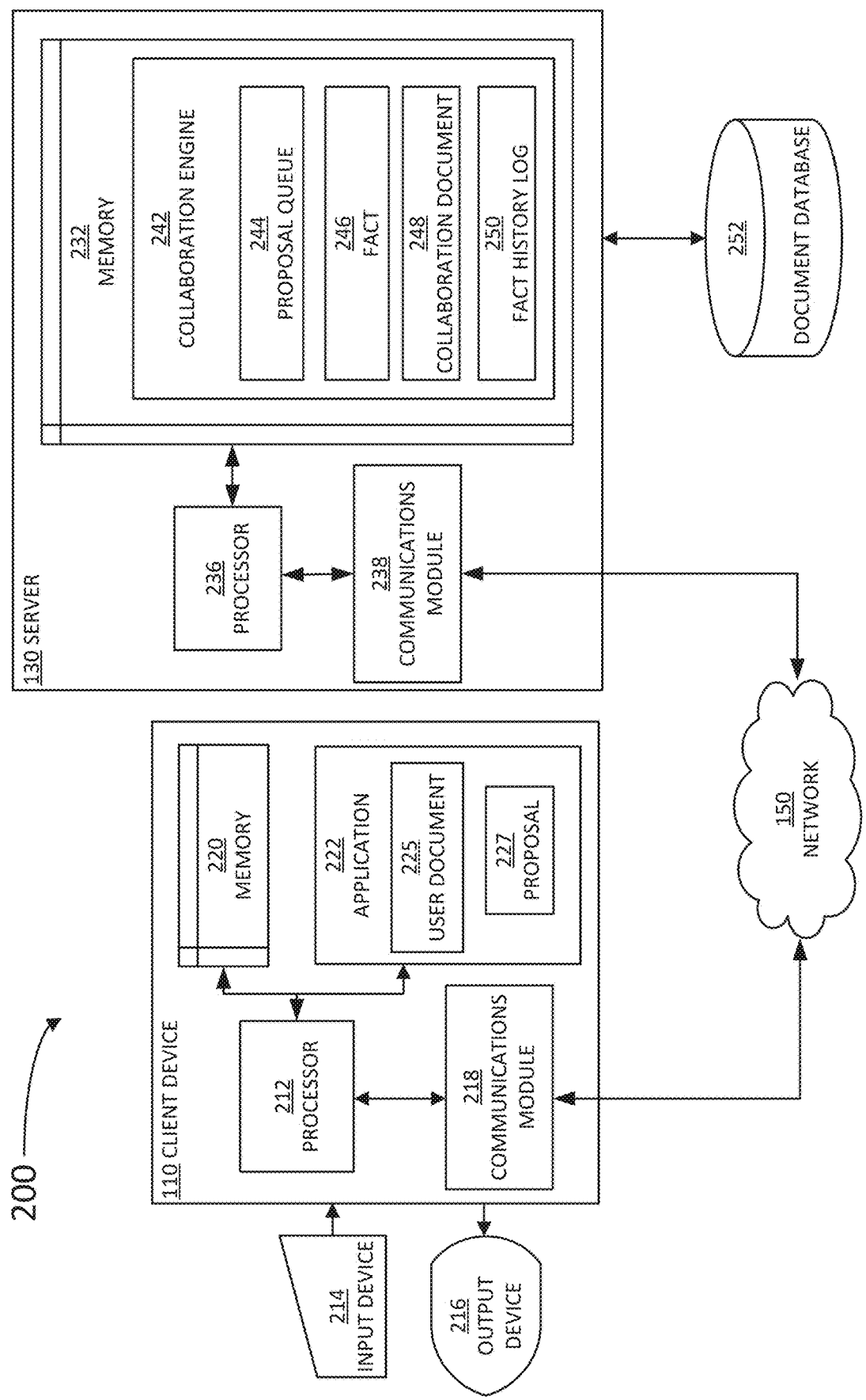
FIG. 2 is a block diagram illustrating an example server and client from the architecture of FIG. 1, according to certain aspects of the disclosure.

FIG. 2 is a block diagram 200 illustrating an example server 130 and client 110 in the architecture 100 of FIG. 1, according to certain aspects of the disclosure. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Server 130 includes a memory 232, a processor 236, and communications module 238. Processor 236 is configured to execute instructions, such as instructions physically coded into processor 236, instructions received from software in memory 232, or a combination of both. Memory 232 includes a collaboration engine 242 for synchronizing and updating versions of a collaboration document 248 by accepting proposals 227 into facts 246, and saving the updated collaboration document 248 in a document database 252. A user may access collaboration engine 242 through an application 222 or a web browser installed in client device 110. Accordingly, application 222 may be installed by server 130 and perform scripts and other routines provided by server 130. Further, in some embodiments. Application 222 may be a collaborative application such that multiple client devices 110 may access and edit a user document 225. A synchronized version of user document 225 is stored in memory 232 of server 130, more specifically in collaboration engine 242, as a collaboration document 248. Execution of application 222 and activation of user document 225 may be controlled by a processor 212 in client 110.

Application 222 creates a proposal 227, which is a set of operations representing a change or modification to user document 225. According to some embodiments, an operation is the basic, smallest unit of change or mutation that can be applied to mutate a data structure (e.g., user document 225), by input device 214 (e.g., via a mouse, a keyboard, a finger on a touchscreen display, a pointer, and the like). An output device 216 may include a display, a speaker, an antenna, or any combination of the above, configured to provide the user with a visual or perceptive rendition of user document 225. Proposal 227 may include a set of operations representing a change in the document that encompasses a clear context of user intent or action.

In some embodiments, proposal 227 includes the context of the user intent when changing or modifying user document 225. In that regard, proposal 227 may include a cluster of actions by the user that represent a unity of purpose for modifying the document. A cluster of actions by the user may include multiple small, incremental modifications to a document. The modifications in a cluster of actions may include small, sequential displacements of an object, or rotations of the object, or a group of deformations of the object. For example, when the user moves a rectangle from point A of a display to point B of the display along a certain trajectory over multiple, small, incremental displacements, application 222 may cluster the small, incremental movements in proposal 227, regardless of the trajectory, to create a proposal that includes a move of the rectangle from point A to point B. In some aspects, the multiple individual displacements to the rectangle may be consolidated into the initial and final position of the rectangle, in proposal 227. Proposal 227 adds an extra layer of semantics to a sequence of operations performed on user document 225. In some embodiments, proposal 227 is defined given the context of a plurality of user actions on user document 225 to determine user intent and thus form proposal 227. Accordingly, in some embodiments proposal 227 includes multiple document actions clustered together in an atomic structure that may be undone as a whole by a remote user. In that regard, a cluster of actions by the user may include a sequence of actions belonging to the same class (e.g. translation, rotation, deformation) before the user performs an action of a different class (e.g., a rotation after multiple translations, a deformation after multiple rotations, and the like).

In some embodiments, memory 232 stores a proposal queue 244 that includes multiple proposals 227 for modifying user document 225. Proposals 227 in proposal queue 244 are provided by multiple client devices 110 through application 222 via communications module 218 and received in server 130 via communications module 238. Collaboration document 248 is a synchronized version of user document 225, after the latest proposal 227 in proposal queue 244 has been promoted into a fact 246 by collaboration engine 242. In some embodiments, fact 246 is a proposal 227, accepted, stored, and indexed via a monotonically increasing sequence id, in the database.

In certain aspects, collaboration engine 242 evaluates proposal 227 from client device 110, together with multiple other proposals from other client devices, cached in a proposal queue 244. Synchronization engine 242 may determine that proposal 227 has no conflict with other proposals and accept proposal 227 to become a fact 246. A fact 246 is a proposal 227 that has been accepted by collaboration engine 242 and stored, indexed via a monotonically increasing sequence id, in a document database 252. Collaboration document 248 is a materialized view of the document with fact 246 implemented on it, and corresponding to a given point in the event sequence that can be generated on-demand.

Accordingly, collaboration engine 242 applies the changes and modifications to collaboration document 248, returns fact 246 to client device 110, and stores fact 246 in a fact history log 250. A user of client device 110 having an application 222 installed by, and registered with, server 130, may have a personal account in document database 252, storing a stack of facts 246 from fact history log 250. Fact history log 250, collaboration engine 242, and document database 252 may be part of the same memory 232 in server 130. In some embodiments, collaboration engine 242 and at least one of document database 252 may be hosted in a different server that is accessible by server 130.

Figure 3:
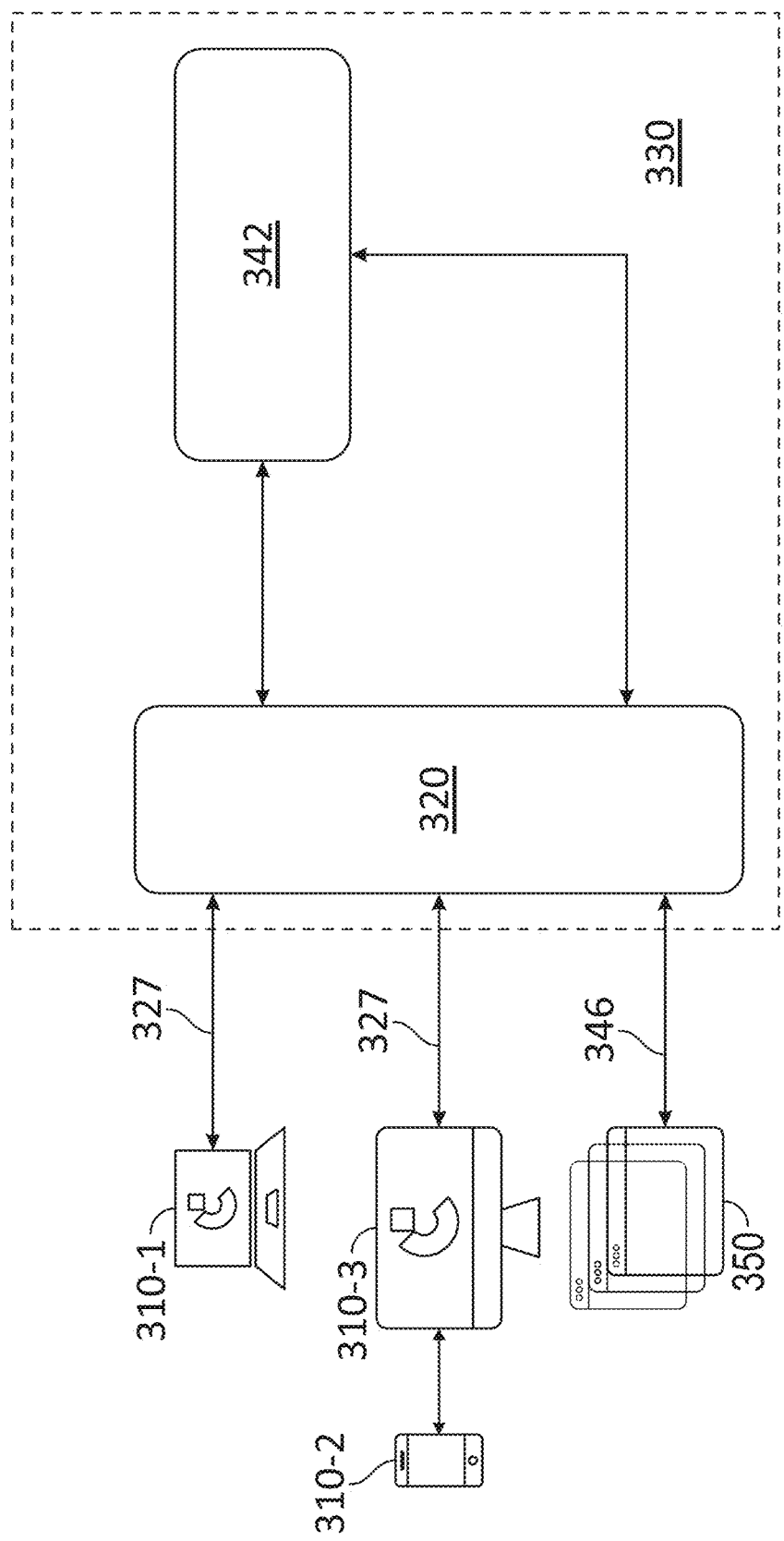
FIG. 3 illustrates a data flow across multiple devices in a synchronized collaboration effort, according to some embodiments.

FIG. 3 illustrates a data flow across multiple devices 310-1, 310-2, and 310-3 (hereinafter, collectively referred to as "client devices 310") in a synchronized collaboration effort, according to some embodiments. In some embodiments, one or more of client devices 310 may be communicatively coupled, or "tethered" with one another (e.g., smart phone 310-2 with desktop 310-3, wirelessly, or otherwise). At the server 330, a back-for-front (BFF) end engine 320 receives proposals 327 from client devices 310. In some embodiments, BFF engine places proposals 327 in a queue (e.g., proposal queue 244), according to time of arrival, or to a time when the proposal was made by the users. In some embodiments, BFF engine may arrange proposals 327 in the queue according to privileges and prerogatives assigned to different users of client devices 310, and/or the type of stream channel used by client devices 310 (e.g., a secured internet connection, Ethernet, modem, local area network, and the like). Synchronization engine 342 receives and processes proposals 327 and returns facts 346 for validated proposals. Facts 346 may be added to a fact sequence, or fact history log 350 that may be broadcasted to client devices 310, or stored in a document database (e.g., document database 252).

Figure 4:
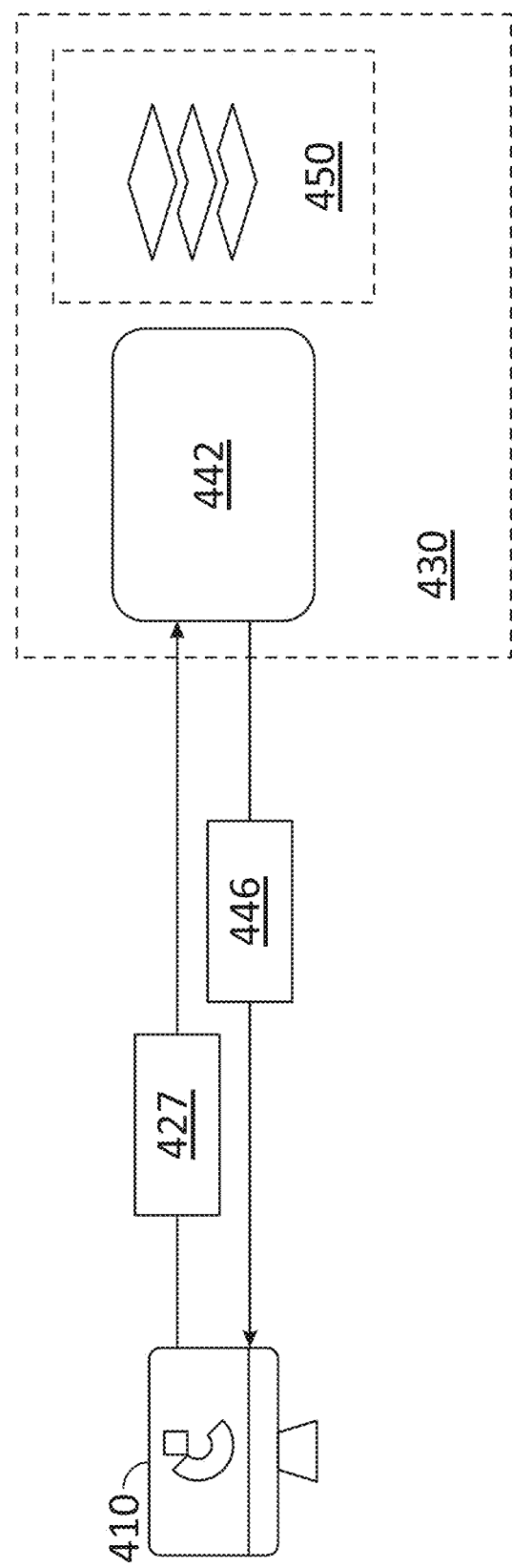
FIG. 4 illustrates a communication between a client device and a server for reconciliation and conflict resolution between events in a synchronized collaboration effort, according to some embodiments.

FIG. 4 illustrates a communication between a client device 410 and a server 430 for reconciliation and conflict resolution between events in a synchronized collaboration effort, according to some embodiments. Accordingly, device 410 provides proposals 427 to server 430. Proposal 427 is evaluated by collaboration engine 442, e.g., in view of other proposals by the same or different users. When proposal 427 is validated (e.g., accepted) by collaboration engine 442, a fact 446 is returned to client device 410. In some embodiments, fact 446 is also stored in fact history log 450.

Figure 5:
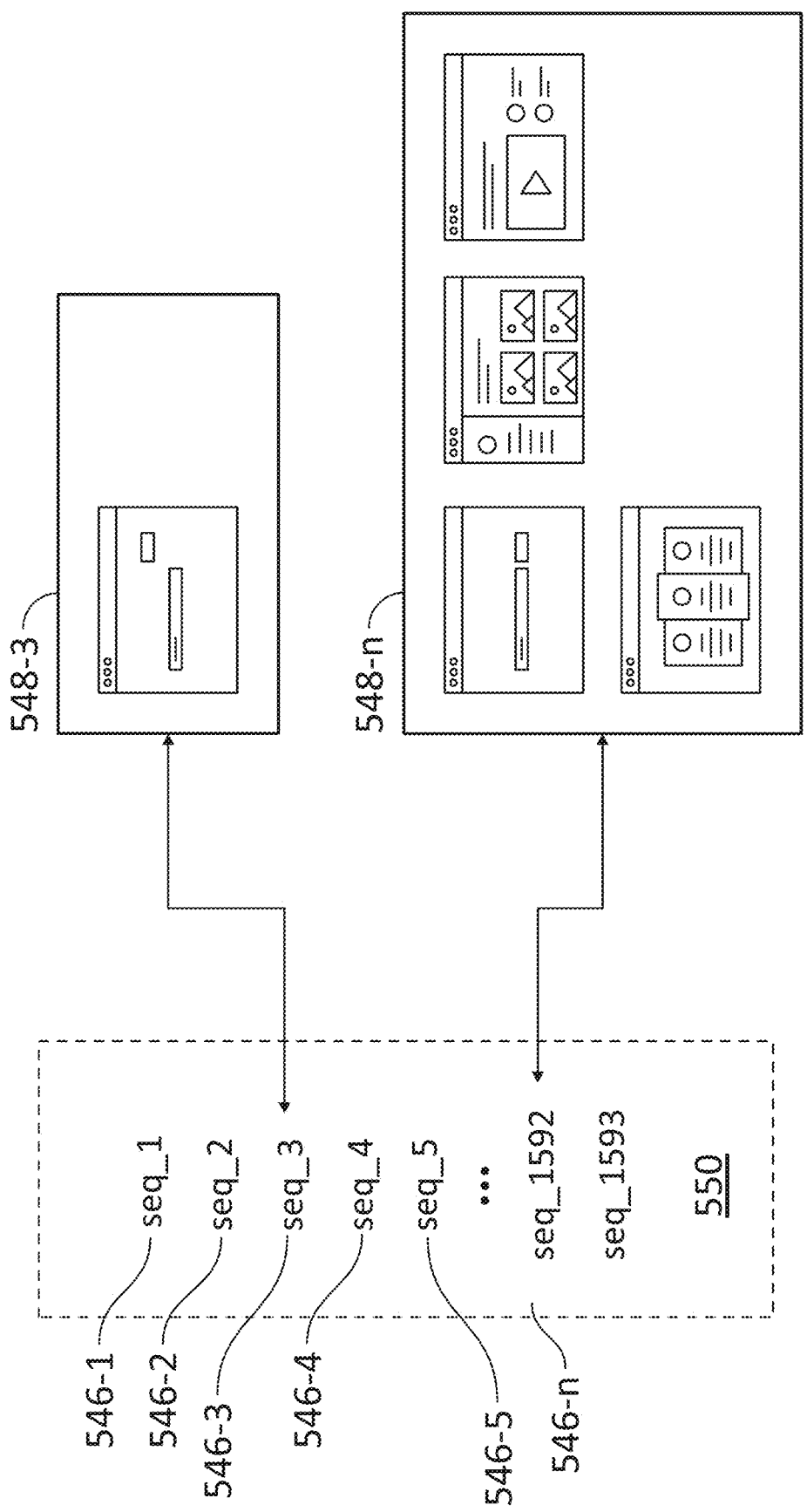
FIG. 5 illustrates a snapshot of materialized steps in a synchronized collaboration effort, according to some embodiments.

FIG. 5 illustrates materialized facts 546-1, 546-2 through 546-n (collectively referred, hereinafter, as facts 546," where n=1592, for illustrative purposes only) in a synchronized collaboration effort, according to some embodiments. Facts 546 are stored in a fact history log 550, which may be accessed by any user from a client device (e.g., client devices 110, 310 or 410) to recover a specific version of a collaboration document 548-3 or 548-n (hereinafter, collectively referred to as "collaboration document 548").

Figure 6:
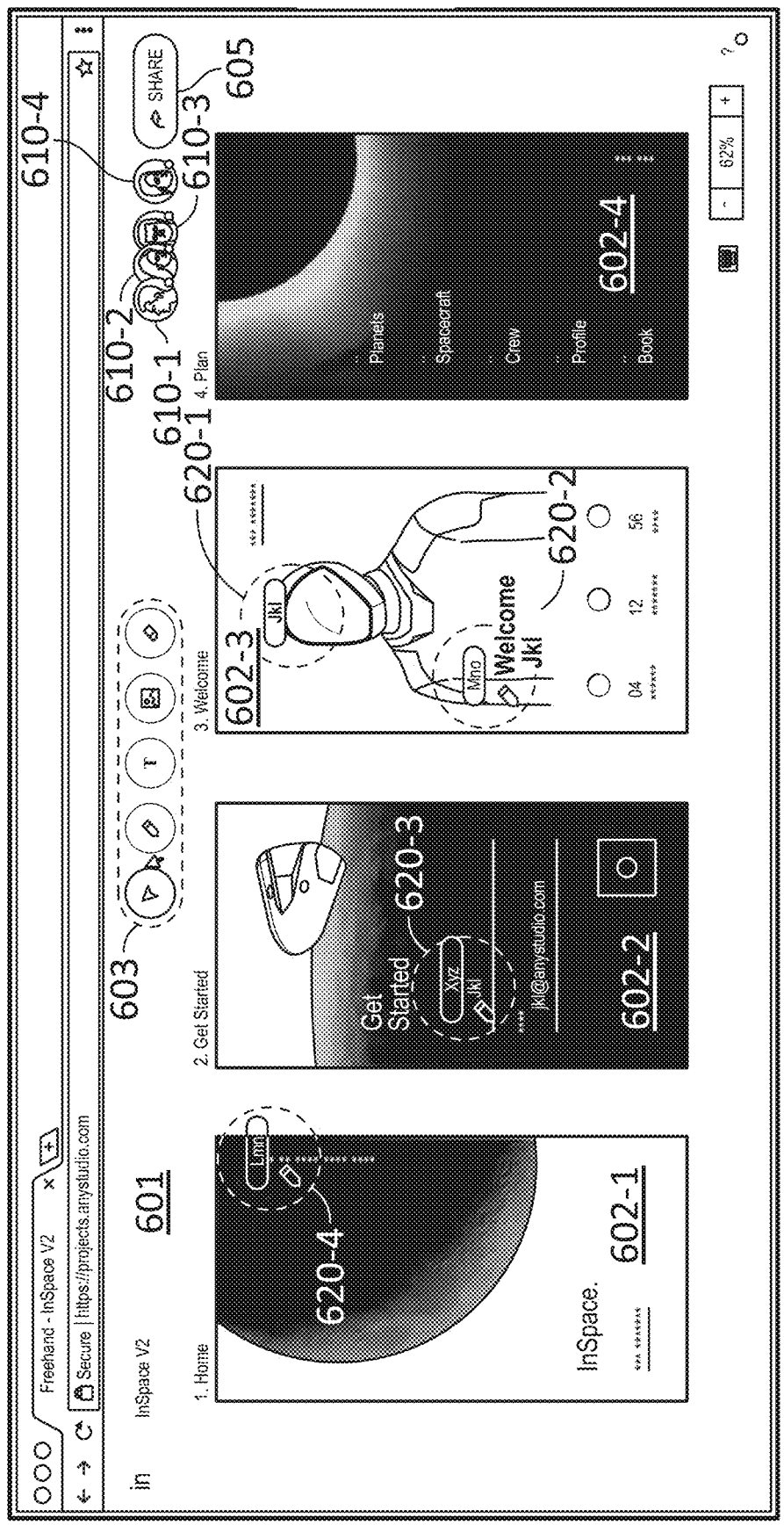
FIG. 6 illustrates a screen shot of a display in a synchronized collaboration effort, according to some embodiments.

FIG. 6 illustrates a screen shot of a display 600 in a synchronized collaboration effort, according to some embodiments. Display 600 illustrates multiple users 610-1, 610-2, 610-3, and 601-4 (hereinafter, collectively referred to as "users 610") collaborating on a document 601. Document 601 may be a network based application, such as a game, or a social networking application, hosted by a server (e.g., server 130). Document 601 may include multiple panels 603-1, 603-2, and 603-4 (hereinafter, collectively referred to as "panels 603") that are part of the network application being collaboratively created by users 610. Users 610 may actively participate with comments and edits into document 601, as shown by icons 620-1, 620-2, 620-3 and 620-4 (hereinafter, collectively referred to as "icons 620") for each user, respectively. Display 600 is available, in real-time, to all users 610 collaborating on document 601. Each of users 610 employs a client device to access display 600 from a server (e.g., client device 110). The server will be the host of the network application that supports document 601.

When one of users 610 performs a series of edits and changes to the document (e.g., multiple document operations) using editing tools 603, the client device of the specific user combines the operations into a cluster, to form a proposal for modifying the document based on a contextual purpose of the user by pressing a "share" button 605. Accordingly, the client device transmits the proposal to the server upon clicking on share button 605 and receives a notification for the server that the proposal has been successfully accepted, by highlighting one of icons 620 corresponding to the user.

Figure 7:
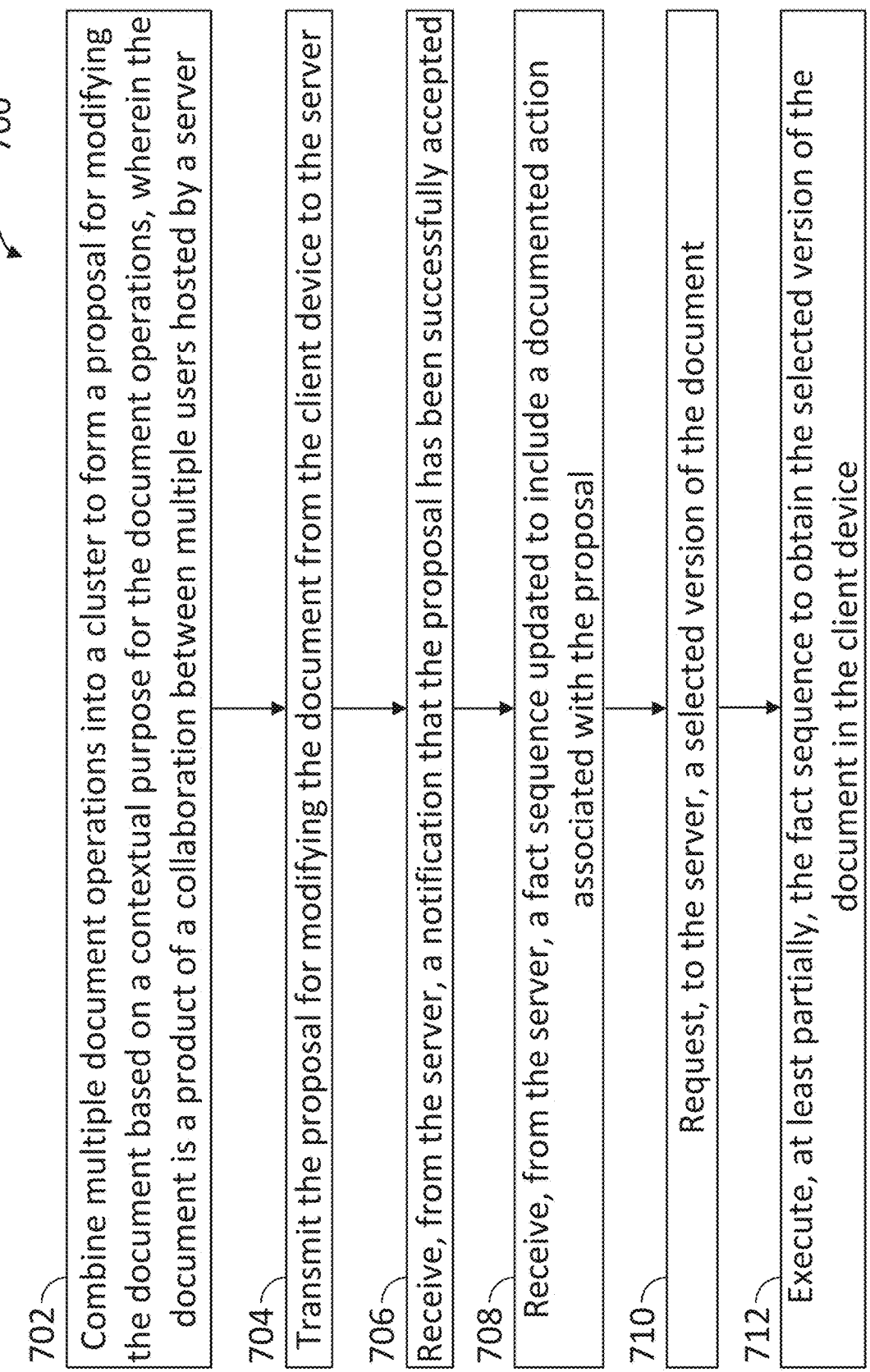
FIG. 7 is a flow chart illustrating steps in a method for synchronizing a collaboration between multiple users on a document, across multiple devices, according to some embodiments.

FIG. 7 is a flow chart illustrating steps in a method 700 for collaborating with one or more other users on a document, using one or more devices, according to some embodiments. Method 700 may be performed, at least partially, by a user with any one of a plurality of client devices (e.g., any one of servers 130 and any one of client devices 110), and communicating with any one of a plurality of network servers hosting a collaborative production of a document (e.g., collaboration document 248). The client devices may be handled by a user, wherein the user may be registered to a private account with the server, or may be a visitor to the server website or logged in a server application and an application element installed in the client device (e.g., application 222). At least some of the steps in method 700 may be performed by a computer having a processor executing commands stored in a memory of the computer (e.g., processors 212 and 236, memories 220 and 232). Further, steps as disclosed in method 700 may include retrieving, editing, and/or storing files in a database that is part of, or is communicably coupled to, the computer, using, inter-alia, a collaboration engine (e.g., collaboration engine 242). The database may include any one of a document database and a fact history log (e.g., document database 252, fact history log 250). Methods consistent with the present disclosure may include at least some, but not all of, the steps illustrated in method 700, performed in a different sequence. Furthermore, methods consistent with the present disclosure may include at least two or more steps as in method 700 performed overlapping in time, or almost simultaneously.

Step 702 includes combining multiple document operations into a cluster to form a proposal for modifying the document based on a contextual purpose for the document operations, wherein the document is a product of a collaboration between multiple users hosted by a server.

Step 704 includes transmitting the proposal for modifying the document from the client device to the server.

Step 706 includes receiving, from the server, a notification that the proposal has been successfully accepted.

Step 708 includes receiving, from the server, a fact sequence updated to include a fact associated with the proposal.

Step 710 includes requesting, to the server, a selected version of the document.

Step 712 includes executing, at least partially, the fact sequence to obtain the selected version of the document in the client device. In some embodiments, step 712 includes combining multiple operations to the document into an atomic set to form the proposal based on a contextual purpose for the operations. In some embodiments, step 612 includes receiving an updated task sequence from the server and undoing in the document a modification from the proposal when the proposal is rejected by the server.

Figure 8:
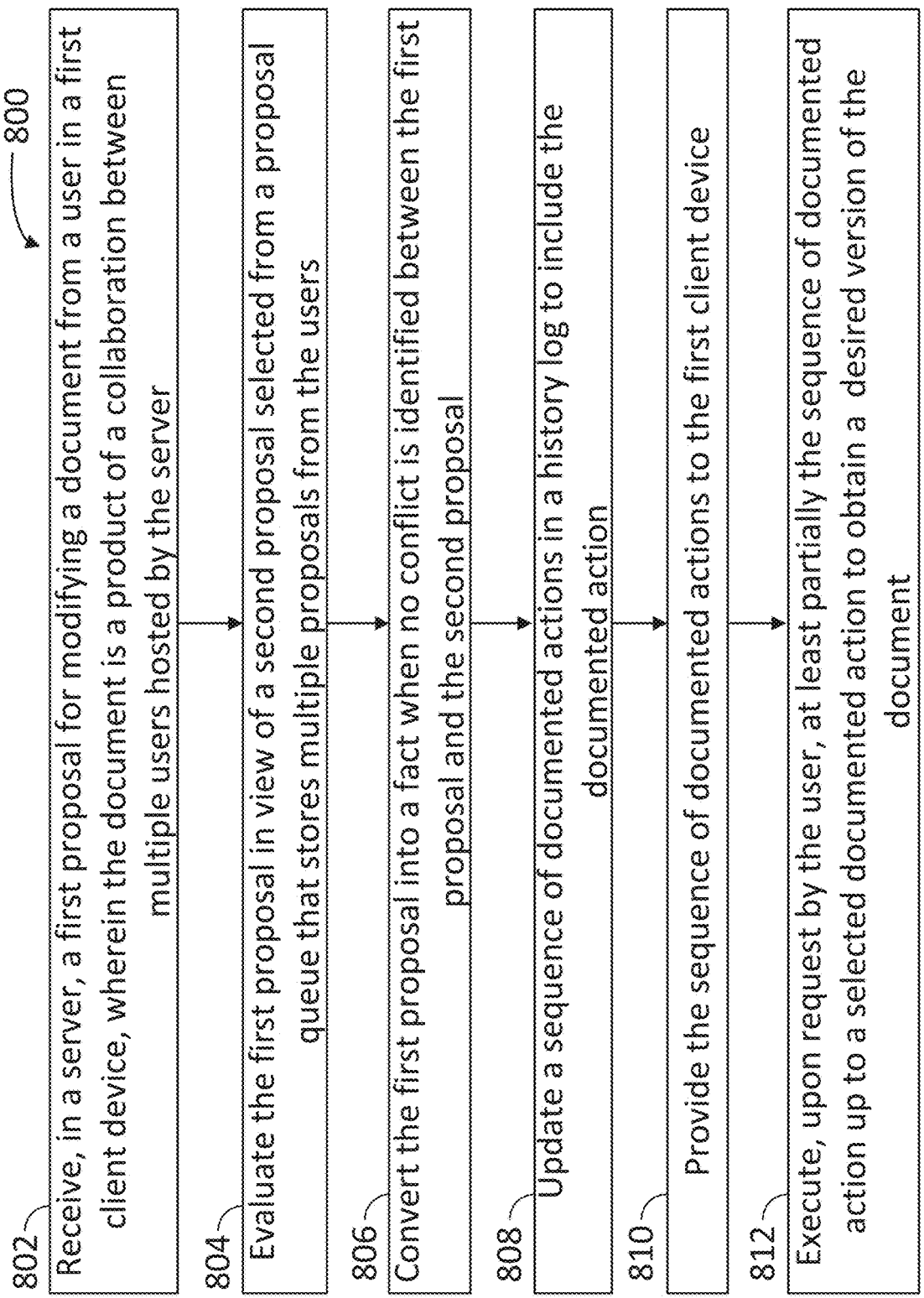
FIG. 8 is a flow chart illustrating steps in a method for collaborating with one or more other users on a document, using one or more devices, according to some embodiments.

FIG. 8 is a flow chart illustrating steps in a method 800 for synchronizing a collaboration between multiple users on a document, across multiple devices, according to some embodiments. Method 800 may be performed, at least partially, by a user with any one of a plurality of client devices (e.g., any one of servers 130 and any one of client devices 110), and communicating with any one of a plurality of network servers hosting a collaborative production of a document (e.g., collaboration document 248). The client devices may be handled by a user, wherein the user may be registered to a private account with the server, or may be a visitor to the server website or logged in a server application and an application element installed in the client device (e.g., application 222). At least some of the steps in method 800 may be performed by a computer having a processor executing commands stored in a memory of the computer (e.g., processors 212 and 236, memories 220 and 232). Further, steps as disclosed in method 800 may include retrieving, editing, and/or storing files in a database that is part of, or is communicably coupled to, the computer, using, inter-alia, an collaboration engine (e.g., collaboration engine 242). The database may include any one of a document database and a fact history log (e.g., document database 252, fact history log 250). Methods consistent with the present disclosure may include at least some, but not all of, the steps illustrated in method 800, performed in a different sequence.

Furthermore, methods consistent with the present disclosure may include at least two or more steps as in method 800 performed overlapping in time, or almost simultaneously.

Step 802 includes receiving, in the server, a first proposal for modifying a document from a user in a first client device, wherein the document is a product of a collaboration between multiple users hosted by the server. In some embodiments, step 802 includes receiving a plurality of proposals from the user in the first client device; and wherein each proposal comprises an irreducible modification to the document. In some embodiments, step 802 includes selecting a single data stream to receive proposals from a single user in the first client device for a selected period of time. In some embodiments, step 802 includes receiving the first proposal from a data stream selected from multiple data streams from multiple devices associated with the users.

Step 804 includes evaluating the first proposal in view of a second proposal selected from a proposal queue that stores multiple proposals from the users. In some embodiments, step 804 includes identifying whether the first proposal comprises a corrupted or invalid data. In some embodiments, step 804 includes determining a chronological order between the first proposal and the second proposal. In some embodiments, step 804 includes identifying a prerogative between the first client device and a second client device that originated the second proposal.

Step 806 includes converting the first proposal into a fact when no conflict is identified between the first proposal and the second proposal.

Step 808 includes updating a fact sequence in a fact history log to include the fact. In some embodiments, step 808 includes providing the fact sequence to the user to enable the user to reproduce a synchronized version of the document while being off-line.

Step 810 includes providing the fact sequence to the client device.

Step 812 includes executing, upon request by the user, the fact sequence up to a selected fact to obtain a desired version of the document. In some embodiments, step 812 also includes executing, upon request by a second user, at least partially, the fact sequence, to provide a second selected version of the document to a second client device.

Hardware Overview

Figure 9:
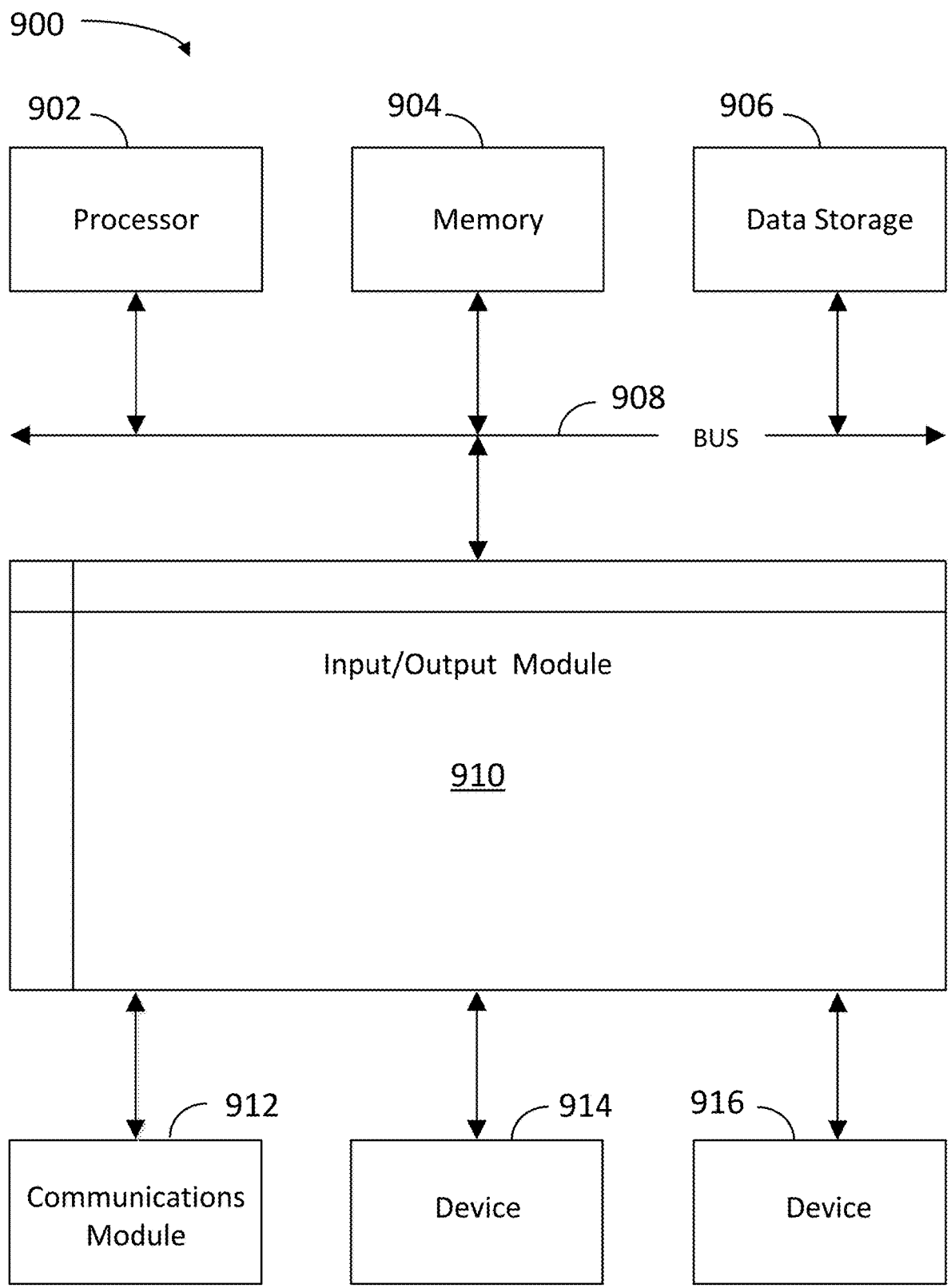
FIG. 9 is a block diagram illustrating an example computer system with which the client and server of FIGS. 1 and 2 and the methods of FIGS. 6 and 7 can be implemented.

FIG. 9 is a block diagram illustrating an exemplary computer system 900 with which the client 110 and server 130 of FIGS. 1 and 2, and the methods of FIGS. 7 and 8 can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processors 212 and 236) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, e.g., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. Input/output module 910 can be any input/output module. Exemplary input/output modules 910 include data ports such as USB ports. The input/output module 910 is configured to connect to a communications module 912. Exemplary communications modules 912 (e.g., communications modules 218 and 238) include networking interface cards, such as Ethernet cards and modems. In certain aspects, input/output module 910 is configured to connect to a plurality of devices, such as an input device 914 (e.g., input device 214) and/or an output device 916 (e.g., output device 216). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as an LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires forming bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter affecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
    storing, in a server, a first version of a document, wherein the document is a product of a collaboration between multiple users hosted by the server;
    clustering a sequence of actions belonging to a same class based on a contextual purpose of the user, to form a first proposal for modifying the document from a user of a first client device;
    receiving, by the server, the first proposal;
    evaluating the first proposal in view of a second proposal selected from a proposal queue that stores multiple proposals from the users;
    converting the first proposal into a documented action when no conflict is identified between the first proposal and the second proposal;
    updating a sequence of documented actions in a history log to include the documented action in a fact sequence, the fact sequence comprising a monotonically increasing sequence of documented actions in a documented action document stored in a fact history log in a database;
    providing the sequence of documented actions to the first client device for executing at least a portion of the sequence of documented actions in the fact sequence; and
    modifying, upon request by a second user of a selected previous version of the document based on multiple actions in the documented action document up to a selected fact from the fact history log, the first version of the document by executing, on the first version of the document, the actions in the documented action document from the first version of the document up to the selected previous version of the document, to recover the selected previous version of the document in a second client device, wherein the selected previous version of the document is not a latest version of the document.

2. The computer-implemented method of claim 1, further comprising executing, upon request by the user, at least partially the sequence of documented actions to provide a selected version of the document to the first client device.

3. The computer-implemented method of claim 1, wherein receiving, by the server, a first proposal for modifying a document from a user comprises selecting a single data stream to receive proposals from a single user in the first client device for a selected period of time.

4. The computer-implemented method of claim 1, wherein receiving, in the server, the first proposal for modifying the document comprises receiving the first proposal from a data stream selected from multiple data streams from multiple devices associated with the users.

5. The computer-implemented method of claim 1, wherein evaluating the first proposal in view of the second proposal comprises identifying whether the first proposal comprises a corrupted or invalid data.

6. The computer-implemented method of claim 1, wherein evaluating the first proposal in view of the second proposal comprises determining a chronological order between the first proposal and the second proposal.

7. The computer-implemented method of claim 1, wherein evaluating the first proposal in view of the second proposal comprises identifying a prerogative between the first client device and a second client device that originated the second proposal.

8. The computer-implemented method of claim 1, wherein providing the sequence of documented actions to the first client device comprises providing the sequence of documented actions to multiple client devices with the users.

9. The computer-implemented method of claim 1, wherein updating a sequence of documented actions in a history log further comprises providing the sequence of documented actions to the user to enable the user to reproduce a synchronized version of the document while being off-line.

10. The computer-implemented method of claim 1, wherein evaluating the first proposal in view of the second proposal comprises determining a stream channel used by the first client device and the second client device.

11. A system comprising:
    one or more processors; and
    a memory coupled to the one or more processors, the memory including instructions that, when executed by the one or more processors, cause the one or more processors to:
    store, in a server, a first version of a document, wherein the document is a product of a collaboration between multiple users hosted by the server;

cluster a sequence of actions belonging to a same class based on a contextual purpose of the user, to form a first proposal for modifying the document from a user of a first client device;
receive, by a server, the first proposal;
evaluate the first proposal in view of a second proposal selected from a proposal queue that stores multiple proposals from the users;
convert the first proposal into a documented action when no conflict is identified between the first proposal and the second proposal;
update a sequence of documented actions in a history log to include the documented action in a fact sequence, the fact sequence comprising a monotonically increasing sequence of documented actions in a documented action document stored in a fact history log in a database;
provide the sequence of documented actions to the first client device to execute at least a portion of the sequence of documented actions in the fact sequence; and
modify, upon request by a second user of a selected previous version of the document based on multiple actions in the documented action document up to a selected fact from the fact history log, an original version of the document by executing, on the first version of the document, the actions in the documented action document from the first version of the document up to the selected previous version of the document, to recover the selected previous version of the document in a second client device, wherein the selected previous version of the document is not a latest version of the document.

12. The system of claim 11, wherein the one or more processors further execute instructions to execute, upon request by the user, at least partially the sequence of documented actions to provide a selected version of the document to the first client device.

13. The system of claim 11, wherein to receive the first proposal the one or more processors further execute instructions to receive a plurality of proposals from the user in the first client device; and wherein each proposal comprises an irreducible modification to the document.

14. The system of claim 11, wherein to receive, in a server, a first proposal for modifying a document from a user the one or more processors execute instructions to select a single data stream to receive proposals from a single user in the first client device for a selected period of time.

15. The system of claim 11, wherein to evaluate the first proposal in view of the second proposal the one or more processors execute instructions to identify whether the first proposal comprises a corrupted or invalid data.

16. The system of claim 11, wherein to evaluate the first proposal in view of the second proposal the one or more processors execute instructions to determine a chronological order between the first proposal and the second proposal.

17. The system of claim 11, wherein to evaluate the first proposal in view of the second proposal the one or more processors execute instructions to identify a prerogative between the first client device and a second client device that originated the second proposal.

18. A computer-implemented method comprising:
storing a first version of a document, wherein the document is a product of a collaboration between multiple users hosted by a server;
combining multiple document operations belonging to a same class into a cluster to form a proposal for modifying a document based on a contextual purpose for the document operations;
transmitting the proposal for modifying the document from a client device to the server;
receiving, from the server, a notification that the proposal has been successfully accepted;
receiving, from the server, a fact sequence, the fact sequence comprising a monotonically increasing sequence of documented actions stored in a fact history log in a database;
requesting, to the server, a selected version of the document; and
executing, at least partially, on the first version of the document and upon request by a second user to recover a selected previous version of the document, a portion of multiple actions in the sequence of documented actions up to a selected fact from the fact history log to obtain the selected version of the document in the client device by applying the portion of multiple actions on the first version of the document up to the selected previous version of the document, wherein the selected version of the document is not a latest version of the document.

19. The computer-implemented method of claim 18, wherein combining multiple document operations into a cluster to form a proposal based on a contextual purpose for the document operations comprises defining an initial state of the document prior to the multiple document operations and a final state of the document after the multiple document operations.

20. The computer-implemented method of claim 18, further comprising receiving an updated task sequence from the server and undoing in the document a modification from the proposal when the proposal is rejected by the server.

* * * * *